United States Patent [19]

Halasa

[11] 3,914,210

[45] Oct. 21, 1975

[54] PROCESS FOR POLYMERIZING BUTADIENE HAVING A HIGH PROPORTION OF SYNDIOTACTIC 1,2-MICROSTRUCTURE

[75] Inventor: Adel Farhan Halasa, Bath, Ohio

[73] Assignee: The Firestone Tire & Rubber Company, Akron, Ohio

[22] Filed: Sept. 26, 1974

[21] Appl. No.: 509,517

[52] U.S. Cl. ............ 260/94.3; 260/80 C; 260/93.1; 260/93.7
[51] Int. Cl.$^2$ ................ C08F 4/44; C08F 36/06; C08F 136/06; C08F 4/52
[58] Field of Search........ 260/94.3, 80 C, 93.1, 93.7

[56] References Cited

UNITED STATES PATENTS

| | | | |
|---|---|---|---|
| 3,182,051 | 5/1965 | Marullo et al. | 260/94.3 |
| 3,300,466 | 1/1967 | Marullo et al. | 260/94.3 |
| 3,778,424 | 12/1973 | Sugiura et al. | 260/94.3 |

*Primary Examiner*—Joseph L. Schofer
*Assistant Examiner*—F. R. Cervi

[57] ABSTRACT

1,3-Butadiene is polymerized to a product having a high proportion of syndiotactic-1,2 structure by polymerizing in the liquid phase in the presence of a catalyst composition comprising:

a. a cobalt-containing component;
  b. a reducing agent having the formula $AlR_3$ wherein R is hydrogen or a hydrocarbon radical of 1–8 carbon atoms;
  c. a modifier or stabilizer, such as tetramethyl ethylene diamine; and
  d. a sulfur halide, such as $SOCl_2$, $S_2Cl_2$, etc.

The cobalt-containing component may be a cobalt salt, such as a cobalt halide, carboxylate, thiocarboxylate, carbonate, etc. or a complex of such a salt with an oxygen-containing or nitrogen-containing group either in the same compound or in a separate compound. The modifier or stabilizer may be selected from a wide variety of compounds including amines, amides, ureas, carbonyl compounds, phosphorus amides, phosphines, etc. Typical reducing agents that may be used are tributyl aluminum, diethyl aluminum hydride, ethyl aluminum dihydride, aluminum tripropyl, aluminum trihydride, etc.

27 Claims, No Drawings

PROCESS FOR POLYMERIZING BUTADIENE HAVING A HIGH PROPORTION OF SYNDIOTACTIC 1,2-MICROSTRUCTURE

BACKGROUND OF THE INVENTION

1. Field of the Invention

This invention relates to a process for the preparation in high yield of a polybutadiene having a substantial proportion of syndiotactic-1,2 microstructure. More specifically this process involves the polymerization of 1,3-butadiene in the presence of a novel catalyst composition.

2. Related Prior Art

U.S. Pat. No. 3,778,424 discloses the preparation of 1,2-polybutadiene which is syndiotactic in character and uses for the polymerization of 1,3-butadiene a catalyst composition comprising (a) a soluble cobalt compound, (b) an $AlR_3$ compound in which R is a hydrocarbon radical of 1-6 carbon atoms, and (c) $CS_2$. The soluble cobalt compound is defined as including, among various other compounds (1) a cobalt salt of an organic carboxylic acid of at least six carbon atoms, such as cobalt octoate and cobalt naphthenate and (2) a complex of a cobalt halide, such as $CoCl_2$, with "a tertiary amine, e.g. pyridine, triethylamine, tributylamine and dimethylaniline, . . . ; and an N,N-dialkylamide, e.g., N,N-dimethyl formamide, N,N-dimethyl acetamide and N,N-diethyl formamide." The only such complex exemplified in the patent is the $CoCl_2$ complex with pyridine.

In the above patent it is indicated that the prior art method of preparing syndiotactic 1,2-polybutadiene is unsatisfactory because of low yields as well as unsatisfactory physical properties. However, the best yield shown in the patent is in Table 5 where the control experiment shows a yield of 56%.

As indicated by the same patentees the melting point of 200°-210°C for the polymers produced by their process makes it difficult to process these polymers. To remedy this problem patentees suggest the use of an organonitrile as a fourth catalyst component to lower the melting point to as low as 100°C. However, as shown in Examples 15-28, the presence of the nitrile also has an adverse effect on the yield (10-35%).

SUMMARY OF THE INVENTION

In accordance with the present invention it has been found that 1,3-butadiene may be polymerized to a polymer of substantial 1,2 content and syndiotactic character by polymerizing 1,3-butadiene in liquid phase in the presence of a catalyst composition comprising:

a. a cobalt-containing component which may be a cobalt salt or a complex of a cobalt salt with an oxygen-containing or nitrogen-containing group, either in the same compound or in a separate compound;

b. a reducing agent having the formula $AlR_3$ wherein R represents hydrogen or hydrocarbon radical of 1-8 carbon atoms;

c. a modifier or stabilizer selected from the class consisting of amines, amides, ureas, thioureas, ketones, phosphoramides and phosphines; and d. a sulphur halide of the formula $SX_2$, $S_2X_2$, $SOX_2$ or $SO_2X_2$ wherein X represents Cl, Br, I or F but preferably Cl.

In this catalyst composition the proportion of Co to monomer is in the range of 0.01–1.0, preferably 0.02–0.1 millimoles of Co compound per 100 gms of monomer; the ratio of Al/Co is 10–500, preferably 25–75 moles of Al compound per mole of Co compound; the ratio of modifier to Co is 0.01–10, preferably 0.5–5 moles of modifier per mole of Co compound; the ratio of S/Co is 1–10, preferably 2–6 moles of S compound per mole of Co.

The catalyst is used in a proportion of 0.01 to 4 millimoles per 100 grams of monomer. In referring to millimoles of catalyst, this corresponds to the millimoles of the cobalt compound since the catalyst is regarded or at least calculated as a complex of the cobalt compound with the other catalyst components.

Contrary to the above-mentioned patent, the cobalt compound does not need to be soluble in the reaction medium and may merely be suspended in the medium. Therefore the limitations placed on the cobalt compounds to insure solubility do not apply in the present invention. Actually a great number of the Co compounds used in the practice of this invention are insoluble in both aromatic and aliphatic hydrocarbons. None the less, polymerization may be conducted by solution or suspension of the cobalt component in aromatic hydrocarbons, such as benzene, toluene, xylene, etc., and also in aliphatic hydrocarbons, such as hexane, heptane, octane, decane, cyclohexane, cycloheptane, etc. If desired the polymerization may be conducted in liquid butadiene.

Typical of the cobalt salts that may be used in the catalyst system of this invention are both cobaltous and cobaltic salts such as the halides, carboxylates, thiocarboxylates, carbonates, etc., e.g. $CoCl_2$, $CoCl_3$, $CoBr_2$, $CoBr_3$, $CoI_2$, $CoI_3$, $CoF_2$, $CoF_3$, Co diacetate, $CoCO_3$, Co diformate, Co dipropionate, Co dihexoate, Co dioctoate, Co dinaphthenate, Co bis(dithioacetate), Co bis(dithiocarbamate), Co bis(mercaptobenzothiazole), etc.

Also useful are salts of carboxylic and thiocarboxylic acids which also contain keto or thioketo or nitrogen groups therein with which the cobalt may be complexed in addition to being attached as a salt component. These are referred to herein as salt-complexes. Typical nitrogen groups that may be present for such complexing purposes are: primary, secondary or tertiary amino groups, i.e., $-NH_2$, $-NH-$ or $>N-$ respectively; the aldimino group, $-CH=NR'$, the ketimino group, $>C=NR'$, the nitro group, $-NO_2$; and the nitroso group, $-N=O$, etc., wherein R' is hydrogen or a hydrocarbon group as defined above for R. Furthermore, also contrary to the above patent, a complexing nitrogen does not need to be in the form of a tertiary amine, but may be also in the form of secondary and primary amines as well as in the form of other nitrogen groups as listed above provided they meet the other limitations or requirements of this invention.

Preferred among the salt-complex formers are the amino-acids such as:

picolinic acid, $C_5H_{10}N(COOH)$;
glycine, $NH_2CH_2COOH$;
alanine, $CH_3CH(NH_2)COOH$;
aminobutyric acid, $CH_3CH_2CH(NH_2)COOH$;
threonine, $CH_3CH(OH)CH(NH_2)COOH$;
norvaline, $CH_3CH_2CH_2CH(NH_2)COOH$;
valine, $(CH_3)_2CHCH(NH_2)COOH$;
methionine, $CH_3SCH_2CH_2CH(NH_2)COOH$;
leucine, $(CH_3)_2CHCH_2CH(NH_2)COOH$;
aspartic acid,

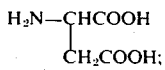

N,N-dimethyldithiocarbomic acid, $(CH_3)_2NCSSH$;
N-acetylanthranilic acid, $o\text{-}CH_3CONHC_6H_4COOH$;
mercaptobenzothiazole,

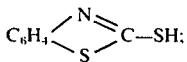

hippuric acid, $C_6H_5CONHCH_2COOH$;
glutamic acid,

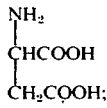

lysine, $NH_2(CH_2)_4CH(NH_2)COOH$;
1,2-diaminopropionic acid, $NH_2CH_2CH(NH_2)COOH$;
aminopimelic acid, $HOOC(CH_2)_4CH(NH_2)COOH$;
betaaminovaleric acid, $CH_2CH_2CH(NH_2)CH_2COOH$;
2,6-diamino-4-hydroxy-caproic acid, $NH_2CH_2CH(OH)CHCH_2CH(NH_2)COOH$;
hydroxyethyl glycine, $HOCH_2CH_2NHCH_2COOH$;
aminoethyl glycine, $NH_2CH_2CH_2NHCH_2COOH$;
iminodiacetic acid, $HN(CH_2COOH)_2$;
iminodipropionic acid, $HN(CH_2CH_2COOH)_2$;
aminoethyliminoacetic acid, $H_2NCH_2CH_2N(CH_2COOH)_2$;
hydroxyethyliminediacetic acid, $NOCH_2CH_2N(CH_2COOH)_2$;
hydroxypropyliminodiacetic acid, $HO(CH_2)_3N(CH_2COOH)_2$;
as well as 3-aminotyrosine, canavanine, 3-4-dihydroxylphenylalanine, ethonine, ethonine sulfone, citrulline, creatine, cysteic acid, cystine, dibromothyronine, glycocyanine, histidine, homocystine, hydroxyproline, methylhistidine, pennicillamine, pyroglutamic acid, thienylalanine, carboxymethyl aspartic acid, etc.

Amino acids preferred in the practice of this invention are the aliphatic aminoacids having no more than about 20 carbon atoms therein, and preferably having an amino group separated from a carboxylic group by no more than two carbon atoms. The aminoacids and their derivatives can have a plurality of amino and carboxylic groups therein and also can contain other functional groups therein which do not interfere with and in some cases even may enhance, the complexing or chelating tendencies of the compound.

Generally the salt is formed which has two acid groups attached to one cobalt atom and the cobalt is furthermore complexed or chelated with the nitrogen.

It is also advantageous, particularly where it is desired to have the cobalt component in solution, to use complexing agents in which the keto, thioketo or nitrogen-containing group is in a separate compound. Suitable compounds for this purpose include beta-diketones of the formula

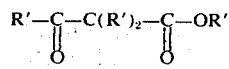

wherein R' is as defined above. Typical examples of these are acetylacetone and ethyl acetoacetate which form complexes with cobalt salts.

Nitrogen-containing compounds are those which contain the various nitrogen-containing groups listed above for the salt-complex formers. In addition to the various compounds listed above, other complex formers are tertiary phosphines, such as triphenyl phosphine, tributyl phosphine, etc., N,N-dialkylamides, such as N,N-dimethylacetamide, N,N-dimethylformamide, N,N-diethylformamide, etc., alcohols, such as methanol, ethanol, propanol, ethylene glycol, etc. Particularly preferred complexing agents for this purpose are compounds containing nitrogen and oxygen or sulfur, preferably with no more than two carbon atoms separating the nitrogen from the oxygen or sulfur. Typical of these are: N-methylpyrrolidone, caprolactam, pyrrolidone, o,m or p-aminoacetophenone, o,m or p-aminobenzophenone, N-methyl-aminoacetophenone, N,N-dimethyl-aminoacetophenone, N-methyl-aminobenzophenone, 2-aminocyclohexanone, 4-aminocyclohexanone, N-methyl-2-aminocyclohexanone, N,N-dimethylcyclohexanone, etc., and the corresponding thioketo compounds, such as N-Me-thiopyrrolidone, thiocaprolactam, amino-thioacetophenone, etc.

When a separate compound is used to form a cobalt complex, such complex former may be used in a proportion of 1–30 moles per mole of cobalt compound, preferably 1–16 moles when a pyrrolidone is used and 1–6 moles when a lactam is used. In the carboxylates and thiocarboxylates used herein, it is generally not necessary to have more than 20 carbon atoms in such compounds.

Reducing agents that may be used in the practice of this invention include trialkyl aluminum, dialkyl aluminum halides, dialkyl aluminum hydrides, monoalkyl aluminum dihalides, aluminum chloride, monoalkyl aluminum dihydride, aluminum trihydride, and the like. Alkyl groups of 1–8 carbon atoms are preferred in the above compounds but even larger groups or aromatic or cycloaliphatic groups such as phenyl, tolyl, xylyl, naphthyl, cyclohexyl, cycloheptyl, etc., may also be present in place of the alkyl groups in the respective compounds. Moreover while the chlorides are preferred as the halide group, the corresponding bromides, iodides and fluorides may also be used.

Typical aluminum trihydrocarbons that may be used include: tributyl aluminum, tripropyl aluminum, trimethyl aluminum, triethyl aluminum, triamyl aluminum, tridecyl aluminum, triphenyl aluminum, diethyl phenyl aluminum, tribenzyl aluminum, tritolyl aluminum, diethyl naphthyl aluminum, tricyclohexyl aluminum, dibutyl cycloheptyl aluminum, triallyl aluminum, etc.

Typical aluminum halides and hydrides that may be used include: $AlCl_3$, dimethyl aluminum chloride, diethyl aluminum chloride, dipropyl aluminum chloride, dibutyl aluminum chloride, diamyl aluminum bromide, dihexyl aluminum iodide, diioctyl aluminum fluoride, dimethyl aluminum hydride, diethyl aluminum hydride, dihexyl aluminum hydride, dipropyl aluminum hydride, diphenyl aluminum hydride, dicyclohexyl aluminum hydride, ethyl aluminum dihydride, butyl aluminum dihydride, amyl aluminum dihydride, octyl aluminum dihydride, phenyl aluminum dihydride, aluminum trihydride, ethyl aluminum dichloride, butyl aluminum dichloride, hexyl aluminum dibromide, phenyl aluminum dichloride, cyclohexyl aluminum difluoride, diphenyl aluminum chloride, and the like.

Modifiers or stabilizers include amines, amides, ureas, thioureas, ketones, peroxides, phosphoramides, phosphines, etc. Some of these compounds are also listed above as complexing agents for the cobalt compounds. In such cases where such a compound is used to serve both functions, a sufficient amount is used for both functions. Typical modifiers include the various nitrogen-containing compounds described above for complexing purposes, such as primary, secondary and tertiary amines, aldimines, ketimines, nitro compounds, nitroso compounds, the amino acids, amides, keto, thioketo and phosphine compounds listed above. Particularly preferred for this purpose are tetramethyl ethylene diamine (TMEDA), triphenyl phosphine ($Q_3P$), N,N-dimethyl formamide (DMF), N,N-dimethyl acetamide (DMA), pyridine, aminopyridine, N-methylaminopyridine, N-methyl acetamide, tetramethyl phenylene diamine, N,N'-dimethyl ethylene diamine, phenylene diamine trimethyl amine, triethyl amine, butylene diamine, isopropyl amine, diisopropyl amine, dibutylamine, diphenylamine, triphenyl amine, tetramethyl urea, tetraethyl thiourea, acetophenone, benzophenone, cyclohexanone, cycloheptanone, hexamethyl phosphorus triamide, trimethyl phosphine, and the like.

The sulfur halides preferred for the purpose of this invention are $SCl_2$, $S_2Cl_2$, $SOCl_2$, and $SO_2Cl_2$. However satisfactory results are also obtained with the corresponding compounds in which part or all of the chlorine is replaced with bromine, iodine or fluorine.

The catalyst combination is preferably prepared in the solution of butadiene and solvent or suspension medium. The order of addition of components is not critical although a preferred embodiment involves the addition of the reducing agent as the last component.

Conjugated dienes that may be polymerized in accordance with this invention include: 1,3-butadiene, isoprene, chloroprene, 2-phenyl-1,3-butadiene, piperylene, etc.

Reaction for as little as 15 minutes will produce a notable amount of the desired polymer. However, it is generally desirable to run the reaction for a least 30 minutes and preferably at least four hours to obtain a substantial yield. Generally it is not necessary to conduct the polymerization beyond 30 hours to obtain practical yields A particularly preferred cobalt compound is cobalt bis(acetylacetonate). This is commercially available in toluene solution or may be prepared by the reaction of a toluene solution of sodium acetylacetonate with $CoCl_2$. The precipitated NaCl is removed by filtration. The toluene solution of cobalt bis(acetylacetonate) is pink. When it is reacted with the sulfur halide, the solution turns to a deep blue color which is intensified upon the addition of the modifier, such as TMEDA. It is possible that the halogen from the sulfur compound replaces some or all of the acetylacetonate to form a mixed compound such as cobalt chloride acetylacetonate or to give cobaltous dichloride which is complexed with byproduct acetylacetonate.

The polymerization may be conducted in the temperature range of 50°C to 150°C, preferably 30°C to 80°C. With appropriate proportions of catalyst components, the yield is generally well above 50% and sometimes quantitative, with the 1,2 content being at least 80%, and generally over 90%, and very high in syndiotactic character with melting points in the range of 190°–220°C.

As indicated above the polymerization is advantageously effected in the presence of an inert diluent to facilitate handling of the polymer and to give better temperature control. Normally liquid hydrocarbons are preferred for this purpose, such as benzene, toluene, aliphatic hydrocarbons such as n-hexane, n-heptane, cyclohexane, etc. or propane, butane, propylene, ethylene, ethane, etc. with the use of higher pressures. Since olefins do not copolymerize with the dienes in this catalyst system, the diluent may consist of substantial portions or wholly of olefin. Where provision is made for external heat dissipation and temperature control, the solvent can be omitted. The polymerization is advantageously conducted in a pressure vessel to avoid loss of monomer and solvent, particularly if temperatures are to be used at or above the boiling point of either.

No other particular conditions are required for the polymerization of this invention except that an inert atmosphere, such as nitrogen, should be used. The polymerization can be performed either batchwise or continuously, using known apparatus. The polymer can be easily isolated by inactivating and eliminating the catalyst by treatment with alcohols, etc.

While applicant does not wish to be restricted to any particular theory or mechanism of reaction, it is believed that the catalyst system operates on the basis that the cobalt compound can be oxidized and reduced. When the cobalt is reduced from a higher valency to a lower valency such as by the action of the aluminum compound, a free redical is liberated which promotes polymerization. The sulfur halide acts to oxidize the lower valent cobalt to higher valent cobalt so that it is again available to go through the reduction step and generate more free radicals. The modifier appears to stabilize or aid in the reduced valency state and therefore aids in the free radical generation step.

In most cases in the practice of this invention the polymer is substantially all of syndiotactic-1,2 structure. However in some cases where the cobalt component is of an insoluble type the polymer may have 40–60% syndiotactic-1,2 structures and 40–60% cis-1,4 structure in the same polymer molecule. Such polymers having this mixed structure generally have two melting points, one generally being −8° to 126°C for the cis-1,4 portion and another of about 200°C for the syndiotactic portion.

These polymers of mixed structures are more rubbery than those of substantially all syndiotactic-1,2 structure. Moreover they are more easily processed, are more easily hydrogenated and more easily thermoset than those more completely of the syndiotactic-1,2 structure.

The polymers obtained from the process of this invention are useful for the production of films, fibers and other shaped articles. Such products have high melting point, high crystallinity, excellent solvent resistance, and good mechanical properties, such as impact strength, etc. Moreover, because of the pendent vinyl groups, products made from these polymers have good printability, adhesion and platability, and such polymers are particularly suitable for crosslinking and grafting posttreatments.

The "dilute solution viscosity" referred to herein is defined as the inherent viscosity determined at 25°C. on a 0.4% solution of the polymer in toluene. It is calculated by dividing the natural logarithm of the relative viscosity by the percent measured at 0.4% concentration. The molecular weights reported herein are determined from these viscosities and are the number average molecular weights.

SPECIFIC EMBODIMENTS OF THE INVENTION

The copolymerizations described below in the working examples are conducted in 28 oz. beverage bottles. These bottles are oven-dried overnight and then capped with crown, three-hole caps and rubber liners. The bottles are cooled and purged with a stream of nitrogen. After cooling, the bottles are charged, by means of a syringe needle inserted through the rubber liner of the cap, with the diene-olefin-diluene blend at 0°C and the modifier, metal compound and aluminum compound are charged in that order. The bottles are then placed in a constant temperature bath equipped with a device for agitating the bottles and retained therein for the desired reaction period. The copolymerization is terminated at the appropriate time by the addition of a methanol-antioxidant solution and the copolymer product is coagulated by pouring the reaction mass into a large volume of methanol or isopropanol containing an antioxidant. The recovered polymer is dried and analyzed by means of infrared spectra.

The invention is illustrated by the following examples which are intended merely for purpose of illustration and are not to be regarded merely for purposes of illustration and are not to be regarded as limiting the scope of the invention or the manner in which it may be practiced. Unless specifically indicated otherwise, parts and percentages are given by weight.

EXAMPLE I

A polymerization is conducted according to the bottle procedure described above using 272 gms of a blend of 27.2 gms butadiene, 21 gms propylene and 223.8 gms of toluene. Cobalt bis (acetylacetonate), tetramethyl ethylene diamine, $SOCl_2$ and triisobutyl aluminum are added in that order to give 3.68 millimoles of Co compound per 100 gms of monomer, a TMEDA/Co ratio of 1/1, a S/Co ratio of 1/1; and an Al/Co ratio of 30/1. Polymerization is effected at 5°C for 16 hours to give a conversion of 80% to a polymer having 73% 1,2 microstructure. This procedure is repeated using identical conditions except that twice the amount of TMEDA is used to give a TMEDA/Co ratio of 2/1. In this case the conversion is 76% and the 1,2 content is 92%. In each case the product is a high melting white powder indicating high syndiotactic content. Moreover there is no propylene in the polymer so the propylene serves merely as a solvent.

EXAMPLE II

The procedure of Example I is repeated using as the modifier an equivalent amount of $CH_3NO_2$ so that the $NO_2$/Co ratio is 1/1. A white powder polymer is obtained with 80% conversion and 78% 1,2 content.

EXAMPLE III

The procedure of Example I is repeated using triphenyl phosphine as the modifier with the proportions as in Example I except that the P/Co ratio is 6/1 and the S/Co ratio is 2/1. The conversion is 63% and the vinyl content is 79%. When this procedure is repeated without the aluminum compound, no polymer is obtained.

EXAMPLE IV

The procedure of Example I is repeated with satisfactory results using an equivalent amount of acetophenone as the modifier in place of the TMEDA.

EXAMPLE V

The procedure of Example I is repeated with satisfactory results using an equivalent amount of pyridine as the modifier in place of the TMEDA.

EXAMPLE VI

The procedure of Example I is repeated a number of times with satisfactory results using in each case an equivalent amount respectively of the following modifiers in place of the TMEDA:
 a. Tetramethyl phenylene diamine
 b. Dimethyl ethylene diamine
 c. Trimethyl amine
 d. 1,4-Diaminebutane
 e. Nitroso-benzene

EXAMPLE VII

The procedure of Example I is repeated a number of times with satisfactory results using in place of the cobalt bis (acetylacetonate) an equivalent amount respectively of:
 a. $CoCl_2$ complex with N-methyl-pyrrolidone (NMP) (16 moles of NMP per mole of $CoCl_2$)
 b. $CoCl_2 \cdot 16$ pyrrolidone
 c. Cobalt dipicolinate
 d. Cobalt caprolactam
 e. Cobalt dihippurate
 f. Cobalt diglycinate

EXAMPLE VIII

The procedure of Example I is repeated a number of times with satisfactory results using in place of the triisobutyl aluminum equivalent amounts respectively of:
 a. triisopropyl aluminum
 b. triphenyl aluminum
 c. dimethyl cyclohexyl aluminum
 d. tribenzyl aluminum
 e. diisobutyl aluminum hydride
 f. diphenyl aluminum hydride
 g. cyclohexyl aluminum dihydride
 h. isoamyl aluminum dihydride
 i tolyl aluminum dihydride
 j. aluminum trihydride

EXAMPLE IX

The procedure of Example I is repeated three times using $S_2Cl_2$ as the sulfur halide instead of $SOCl_2$. In each case the following proportions are used: 3.68 millimoles of Co bis (aetylacetonate), a TMEDA/Co ratio of 1/1; an Al/Co ratio of 12/1, and the S/Co ratio is varied as shown in the following table together with the results. In each case the vinyl content is approximately 90% 1,2 by nuclear magnetic resonance (NMR) analysis and the high melting point confirms high syndiotactic content.

Table I

| S/Co Ratio | % Conversion | $t_m$(°C) | $t_g$(°C) |
|---|---|---|---|
| 0.1/1 | 79 | 210 | −41 |
| 0.4/1 | 86 | 209 | — |
| 1.0/1 | 100 | 208 | — |

EXAMPLE X

The procedure of Example IX is repeated using an equivalent amount of triphenyl phosphine as the modifier in place of TMEDA and an Al/Co ratio of 20/1. The mixing of the catalyst components is effected at −78°C. The polymerization temperature is held at 30°C for 24 hours to give a conversion of 82.4%. When the procedure is repeated without the triphenyl phosphine no polymer is obtained.

EXAMPLE XI

The procedure of Example IX is repeated four times using an equivalent amount of triphenyl phosphine instead of TMEDA as the modifier and varying amounts of triisobutyl aluminum. The varying proportions and results are given in the table below.

Table II

| Al/Co Ratio | % Conversion | $T_g$(°C) |
|---|---|---|
| 20 | 50 | −39 |
| 30 | 75 | −37 |
| 40 | 75 | −39 |

As in the various other above examples there is no propylene in the resultant high vinyl polymers. The melting points are in the range of 150°–180°C indicating a mixture of rubbery polymer and syndiotactic polymer.

EXAMPLE XII

The procedure of Example IX is repeated three times using double the equivalent amount of pyridine as modifier in place of the TMEDA and varying Al/Co ratios of 12/1, 15/1 and 20/1. With catalyst mixing performed at 30°C and polymerization effected at 5°C for 48 hours, each polymerization gives high yield of high molecular weight 1,2 polymer.

EXAMPLE XIII

The procedure of Example IX is repeated using an equivalent amount of nitromethane in place of the TMEDA and an Al/Co ratio of 30/1 to give a high yield of polymer having 77.4% 1,2.

EXAMPLE XIV

The procedure of Example IX is repeated a number of times with satisfactory results using in place of the Co bis(acetylacetonate) an equivalent amount respectively of
  a. $CoCl_2 \cdot 16$ NMP
  b. $CoCl_2 \cdot 16$ pyrrolidone
  c. Cobalt dipicolinate
  d. Cobalt caprolactam
  e. Cobalt dihippurate
  f. Cobalt diglycinate

EXAMPLE XV

The procedures of Examples I–VIII are repeated with similar results using in place of the $SOCl_2$ an equivalent amount of $SO_2Cl_2$.

EXAMPLE XVI

The procedures of Examples I–VIII are repeated with similar results using in place of the $SOCl_2$ an equivalent weight of $SCl_2$.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. A process for the preparation of polybutadiene having at least 40 percent by weight of syndiotactic microstructure which comprises polymerizing 1,3-butadiene in the liquid phase in the presence of a catalyst composition consisting essentially of:
   a. a cobalt-containing component selected from the class consisting of cobalt halides, carboxylates, thiocarboxylates, carbonate and complexes of said halides, carboxylates, thiocarboxylates and carbonate, said complex being formed between the cobalt and a nitrogen, keto or thioketo group in the same compound or with a separate cyclic compound having both a nitrogen and keto or thioketo group therein;
   b. a reducing agent having the formula $AlR_3$ wherein R is hydrogen or a hydrocarbon radical of 1–8 carbon atoms;
   c. a sulfur halide selected from the class consisting of $SOCl_2$, $S_2Cl_2$, $SO_2Cl$ and $SCl_2$; and,
   d. a modifying compound having a group therein selected from the class consisting of amine, aldimine, ketimine, nitro, nitroso, amide, keto, thioketo, phosphoramide and phosphine.

2. The process of claim 1 in which said sulfur halide is $SOCl_2$.

3. The process of claim 2 in which said reducing agent is an aluminum trialkyl.

4. The process of claim 3 in which said cobalt compound is cobalt bis(acetylacetonate).

5. The process of claim 4 in which said modifier is an amine.

6. The process of claim 4 in which said modifier is a tertiary amine.

7. The process of claim 4 in which said modifier is tetramethyl ethylene diamine.

8. The process of claim 4 in which said modifier is triphenyl phosphine.

9. The process of claim 4 in which said modifier is nitromethane.

10. The process of claim 4 in which said modifier is acetophenone.

11. The process of claim 1 in which said sulfur halide is $S_2Cl_2$.

12. The process of claim 11 in which said reducing agent is an aluminum trialkyl.

13. The process of claim 12 in which said cobalt component is cobalt bis(acetylacetonate).

14. The process of claim 13 in which said modifier is an amine.

15. The process of claim 13 in which said modifier is a tertiary amine.

16. The process of claim 13 in which said modifier is tetramethyl ethylene diamine.

17. The process of claim 13 in which said modifier is triphenyl phosphine.

18. The process of claim 13 in which said modifier is nitromethane.

19. The process of claim 13 in which said modifier is acetophenone.

20. The process of claim 1 in which said sulfur halide is $SO_2Cl_2$.

21. The process of claim 1 in which said sulfur halide is $SCl_2$.

22. The process of claim 1 in which said reducing agent is a dialkyl aluminum hydride.

23. The process of claim 1 in which said reducing agent is an alkyl aluminum dihydride.

24. The process of claim 16 in which the proportion of Co compound is 0.01–1.0 millimole per 100 grams of monomer, the proportion of Al compound is 10–500 moles per mole of Co compound, the proportion of modifier is 0.01–10 moles per mole of Co compound, and the proportion of sulfur halide is 1–10 moles per mole of Co compound.

25. The process of claim 16 in which the proportion of Co compound is 0.02–0.1 mollimole per 100 grams of monomer, the proportion of Al compound is 25–75 moles per mole of Co compound, the proportion of modifier is 0.5–5 moles per mole of Co compound, and the proportion of sulfur halide is 2–6 moles per mole of Co compound.

26. The process of claim 1 in which the proportion of Co compound is 0.01–1.0 millimole per 100 grams of monomer, the proportion of Al compound is 10–500 moles per mole of Co compound, the proportion of modifier is 0.01–10 moles per mole of Co compound, and the proportion of sulfur halide is 1–10 moles per mole of Co compound.

27. The process of claim 1 in which the proportion of Co compound is 0.02–1 millimole per 100 grams of monomer, the proportion of Al compound is 25–75 moles per mole of Co compound, the proportion of modifier is 0.5–5 moles per mole of Co compound, and the proportion of sulfur halide is 2–6 moles per mole of Co compound.

* * * * *